(No Model.)
E. L. PRINS.
PRESERVATIVE COVER FOR WATER CLOSETS.
No. 496,536. Patented May 2, 1893.
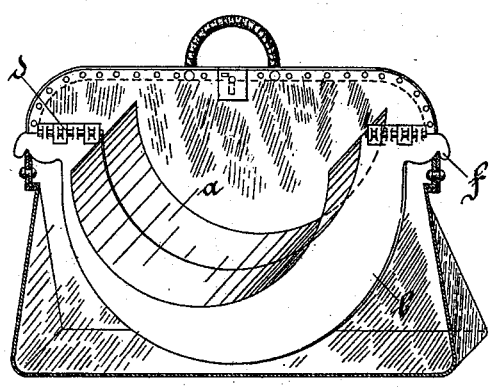
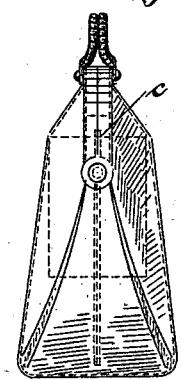
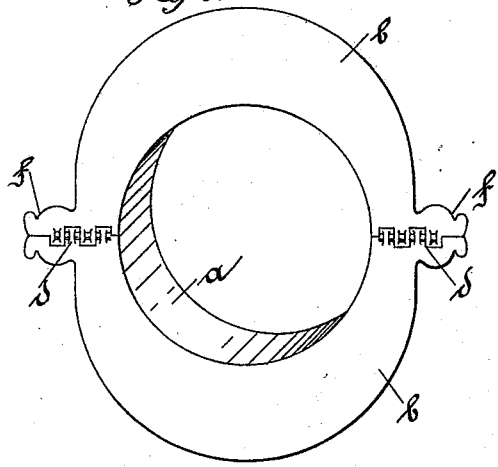
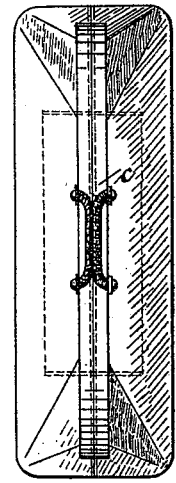
Attests
J. N. Dobson
Robert Meland
Elisa Liepman Prins,
Inventor
by Foster Freeman
Attorneys

UNITED STATES PATENT OFFICE.

ELISA LIEPMAN PRINS, OF ANTWERP, BELGIUM.

PRESERVATIVE COVER FOR WATER-CLOSETS.

SPECIFICATION forming part of Letters Patent No. 496,536, dated May 2, 1893.

Application filed October 20, 1892. Serial No. 449,499. (No model.)

*To all whom it may concern:*

Be it known that I, ELISA LIEPMAN PRINS, merchant, of Rue de l'Empereur, Antwerp, in the Kingdom of Belgium, have invented a new and useful Preservative Cover for Water-Closets, of which the following is a specification, reference being had therein to the accompanying drawings.

The herein described safety seat or cover for closet seats has the object of protecting the public, and especially the traveling public against contagion which takes place daily, and which may prove fatal.

For greater convenience and to facilitate transportation the apparatus is made in two pieces capable of being folded together and it is preferably made of aluminium although other suitable kind of material may be employed and the seat or cover may be conveniently placed upon any closet.

Figure 1 is a perspective view of the apparatus opened out for use. Fig. 2 is a side view. Fig. 3 is an end view, and Fig. 4 is a plan or top view of a bag with the seat or cover arranged therein for transportation. The side of the bag in Fig. 2 is removed for facility of explanation.

The apparatus is composed of two half cylinders which when placed together form the cylinder $a$, see Fig. 1, which is connected at its upper side or end with a flange which is more or less nearly round. The flange is also made in two pieces which are joined together truly by two hinges and when out of use may be placed one against the other. This safety seat or cover will be placed in a specially constructed bag or carrier, which is provided with spaces or recesses in the end portions of the mouth frame adjacent to the hinges to receive the extended or projecting ends of the hinges of the safety seat or cover which extended or projecting ends of the hinges rest upon the hinges of the bag or carrier.

When the apparatus is about to be used the safety seat or cover is taken out of the before mentioned bag or carrier and the halves of the flanges $b\ b$ which were closed together are opened out so that the half cylinders $a$ form a cylinder. When in this position the safety seat or cover may be placed upon any closet with the flanges resting on the closet seat and the cylinder passing a short distance down the opening.

What I claim, and desire to secure by Letters Patent of the United States, is—

1. A safety seat or cover for closets consisting of two half cylinders, forming when placed properly together a cylinder, flanges connected to such half cylinders and hinges connecting the two flanges together, the said flanges and half cylinders being capable of being folded together for transportation and of being opened out for use substantially as herein shown and described.

2. A bag or carrier for a safety seat or cover for closets formed with recesses or spaces in the end portions of the mouth frame to receive extended or projecting portions of hinges connecting the two parts of the seat or cover together, such projecting or extended portions of the hinges when in the bag or carrier resting on the hinges of the latter substantially as herein shown and described.

In witness whereof I have hereunto set my hand in presence of two witnesses.

ELISA LIEPMAN PRINS.

Witnesses:
PAUL FISCHER,
JOHN B. JACKSON.